United States Patent
Won (10) Patent No.: US 8,326,204 B2
(45) Date of Patent: Dec. 4, 2012

(54) AUTOMATIC DOCUMENT FEEDER AND SCANNER HAVING THE SAME

(75) Inventor: Jung-Yun Won, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 572 days.

(21) Appl. No.: 12/502,578

(22) Filed: Jul. 14, 2009

(65) Prior Publication Data

US 2010/0061781 A1 Mar. 11, 2010

(30) Foreign Application Priority Data

Sep. 9, 2008 (KR) .................. 10-2008-0089005

(51) Int. Cl.
*G03G 15/00* (2006.01)
*B65H 7/02* (2006.01)
(52) U.S. Cl. ............ 399/367; 399/21; 271/265.01
(58) Field of Classification Search .......... 399/367, 399/21, 380; 271/3.13, 3.15, 258.01, 258.03, 271/258.05, 259, 265.01, 265.02, 110, 3.01
See application file for complete search history.

(56) References Cited

U.S. PATENT DOCUMENTS

| | | | |
|---|---|---|---|
| 5,713,569 A * | 2/1998 | Girard et al. .......... | 271/149 |
| 5,971,388 A | 10/1999 | Hattori et al. | |
| 6,185,381 B1 * | 2/2001 | Nakahara et al. ........ | 399/21 |
| 7,202,983 B2 * | 4/2007 | Yokota et al. .......... | 358/496 |
| 7,887,205 B1 * | 2/2011 | Knoble et al. .......... | 362/20 |
| 2009/0153922 A1 * | 6/2009 | Murrell et al. .......... | 358/505 |

FOREIGN PATENT DOCUMENTS

| | | |
|---|---|---|
| JP | 8-290850 | 11/1996 |
| JP | 2005-200129 | 7/2005 |

OTHER PUBLICATIONS

English langauge abstract of JP 2005-200129, published Jul. 28, 2005.
Machine English langauge translation of JP 2005-200129, published Jul. 28, 2005.
Korean Office Action issued Oct. 8, 2012 in corresponding Korean Patent Application No. 10-2008-0089005.

* cited by examiner

*Primary Examiner* — Judy Nguyen
*Assistant Examiner* — Justin Olamit
(74) *Attorney, Agent, or Firm* — Staas & Halsey LLP (57) ABSTRACT

An automatic document feeder and a scanner having the same are provided. The automatic document feeder can include a transport unit configured to transport a document to a scanning unit, an apparatus main body configured to hold the transport unit, a cover configured to be rotatably disposed on the apparatus main body, and a sensing unit disposed on a document transportation path to sense whether the cover is open or closed, the position of the document, or both. The automatic document feeder and the scanner having the same are configured to allow a jammed document to be ejected without having the document be damaged.

17 Claims, 9 Drawing Sheets

AUTOMATIC DOCUMENT FEEDER AND SCANNER HAVING THE SAME

CROSS-REFERENCE TO RELATED APPLICATION

This application claims priority from Korean Patent Application No. 10-2008-0089005, filed on Sep. 9, 2008 in the Korean Intellectual Property Office, the disclosure of which is incorporated herein by reference in its entirety.

TECHNICAL FIELD

Apparatuses consistent with the present disclosure relate to an automatic document feeder and a scanner having the same, and more particularly, to an automatic document feeder capable of ejecting a jammed document without damaging the document and a scanner having the same.

BACKGROUND OF RELATED ART

A scanner typically includes a scanning unit configured to scan an image on a document, and an automatic document feeder configured to automatically supply one or more documents loaded on a loading support to the scanning unit to perform scanning of the document at high speed.

The automatic document feeder can include a sensing unit that senses or detects whether a document has been supplied to the scanning unit. The sensing unit can be of a touch type, for example. The sensing unit can include a lever and a sensor. The lever can be disposed on a document transportation path leading to the scanning unit such that the lever rotates to different positions according to whether the lever makes contact or not with the document. The sensor can sense the position of the lever.

When a document jams while passing through the lever and the user pulls the document in a direction opposite to the direction in which the document is transported within the scanner to eject the document, the lever may also move in the ejecting direction. In such an instance, the document may be torn and damaged by the lever as the user tries to remove the jammed document from the scanner.

The automatic document feeder can include a cover disposed on a main body of the scanner that can easily open and close to make the ejection of the jammed document convenient. Moreover, a separate sensor from the one described above can be provided to sense the opening and closing of the cover.

SUMMARY OF THE DISCLOSURE

In one aspect of the present disclosure, an automatic document feeder is provided that can include a transport unit configured to transport a document to a scanning unit, a cover rotatably disposed on an apparatus main body configured to house the transport unit, and a sensing unit disposed along a document transportation path defined at least in part by the transport unit and the scanning unit and configured to sense whether the cover is open or closed, the position of the document, or both.

The sensing unit can include a lever, a member, and a sensor. The lever can be configured to move between a first position and a second position along the document transportation path, the lever being in contact with the document passing through the document transportation path when in the first position, the lever not being in contact with the document passing through document transportation path when in the second position. The member can be configured to move the lever to the first position or the second position based on whether the cover is open or closed. The sensor can be configured to sense the position of the lever.

The member of the sensing unit can be configured to prevent the lever from moving from the first position to the second position when the cover rotates to an open position.

The lever can be rotatably disposed within the apparatus main body.

The member of the sensing unit can be configured to move to a contact position in which the member of the sensing unit is in contact with the lever and the cover when the cover rotates to an open position, or move to a contact-withdrawing position in which the member of the sensing unit is not in contact with the lever and the cover when the cover rotates to a closed position.

The automatic document feeder can include a driven unit configured to extend from an outer surface of the lever in a radial direction and configured to contact the member of the sensing unit.

The member of the sensing unit can be configured to slideably move between the contact position and the contact-withdrawing position.

The automatic document feeder can include a first elastic member configured to elastically bias the member of the sensing unit toward the contact-withdrawing position.

The automatic document feeder can include a second elastic member configured to elastically bias the lever toward the second position.

The automatic document feeder can include a control unit configured to determine the position of the document, whether the cover is open or closed, or both, based on a sensing result of the sensor and a state of the transport unit.

The control unit can be configured to determine that the cover is in an open position when the lever is sensed to move from the second position to the first position and the transport unit is in a stop state.

The control unit can be configured to determine that the document is passing through the lever when the lever is sensed to move from the second position to the first position and the transport unit is in an operating state.

The control unit can be configured to determine that the document has passed through the lever when the lever moves from the first position to the second position within a predetermined time.

The control unit can be configured to determine that the document is jammed when the lever has not move from the first position to the second position within a predetermined time.

The control unit can be configured to stop the transport unit when the document is determined to be jammed.

In another aspect of the present disclosure, an automatic document feeder is provided that includes a transport unit configured to transport a document to a scanning unit, a cover rotatably disposed on an apparatus main body configured to house the scanning unit, a lever configured to move between a first position and a second position along the document transportation path, the lever being in contact with the document passing through the document transportation path when in the first position, the lever not being in contact with the document passing through document transportation path when in the second position, and a member configured to prevent the lever from moving from the first position to the second position when the cover rotates to an open position.

In yet another aspect of the present disclosure, a scanner is provided that includes an automatic document feeder as described above and a scanning unit configured to scan the document transported by the automatic document feeder.

According to even yet another aspect, an automatic document feeder that can be used in a document scanner of the type that includes a main housing body for supporting therein a transport unit configured to deliver a document to be scanned to a scanning unit along a document transport path. The main housing body may further have disposed thereon a cover. Such automatic document feeder may comprise a lever disposed at a sensing location along the document transport path. The lever may be movable between a first position and a second position. The automatic document feeder may further comprise a member movable in association with the cover between a contact position and a non-contact position. The member may be in the contact position when the cover is open, and, when in the contact position, may be in an interfering contact with the lever so as to cause the lever to move to the second position. The member may be in the non-contact position when the cover is closed, and, when in the non-contact position when the cover is closed, may not contact the lever. The automatic document feeder may further include a sensor configured to output a sensing signal indicative of a position of the lever.

The automatic document feeder may further comprise a control unit, which may be configured to determine that the document to be scanned is positioned at the sensing location along the document transport path if the sensing signal from the sensor indicates that the lever is in the second position when the transport unit is operating. The control unit may further be configured to determine that the cover is open if the sensing signal from the sensor indicates that the lever is in the second position when the transport unit is not operating.

The control unit may further be configured to determine a document jam has occurred if based on the sensing signal the lever has not move from the first position to the second position within a predetermined time while the transport unit is operating.

The member may be configured to remain in the contact position to prevent the lever from moving from the second position to the first position while the cover is open.

BRIEF DESCRIPTION OF THE DRAWINGS

The present disclosure will become apparent and more readily appreciated from the following description of the exemplary embodiments, taken in conjunction with the accompanying drawings, in which.

DETAILED DESCRIPTION OF SEVERAL EMBODIMENTS

Reference will now be made in detail to various embodiments of the present disclosure, examples of which are illustrated in the accompanying drawings, wherein like reference numerals refer to like elements throughout. The embodiments are described below by referring to the figures. In some instances, the description of like elements from different embodiments may be omitted for brevity.

Figure 1:
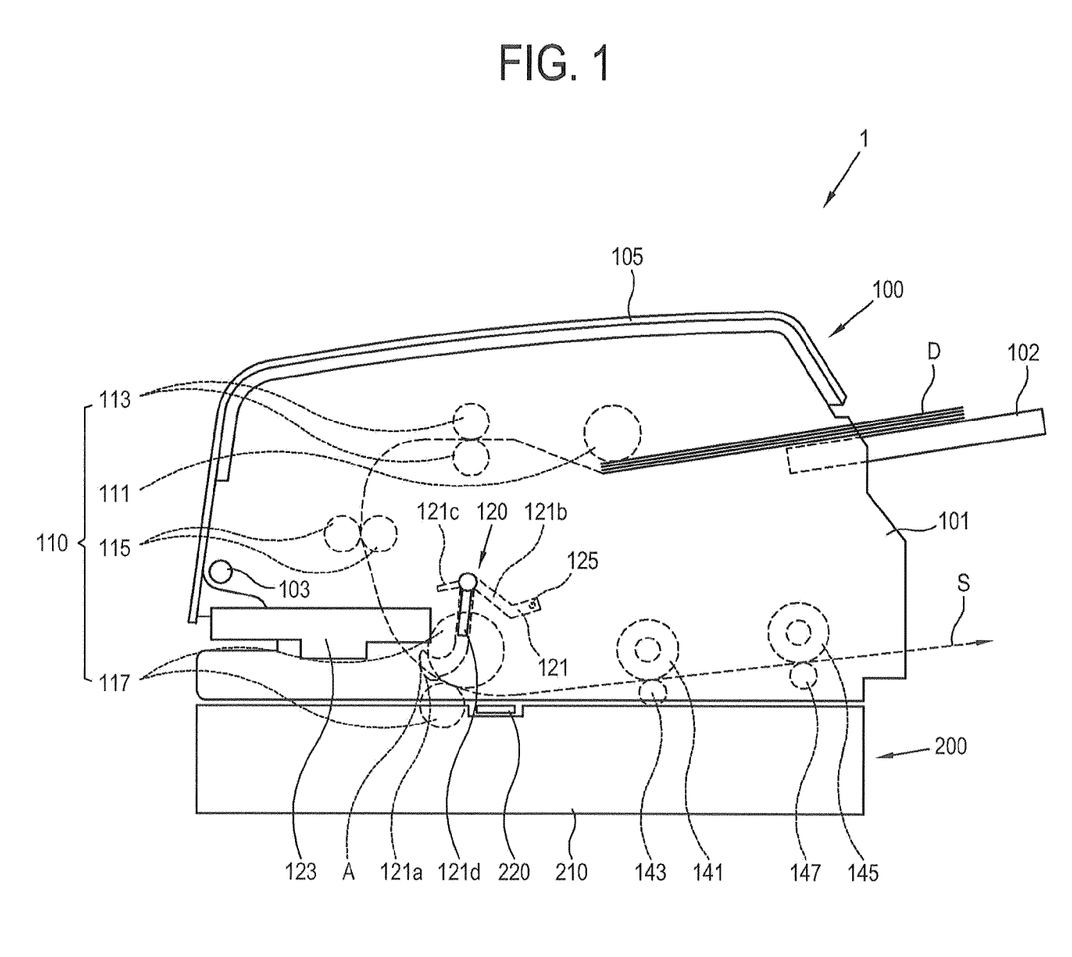
FIG. 1 is a schematic side view of a scanner according to an embodiment of the present disclosure.
Figure 2:
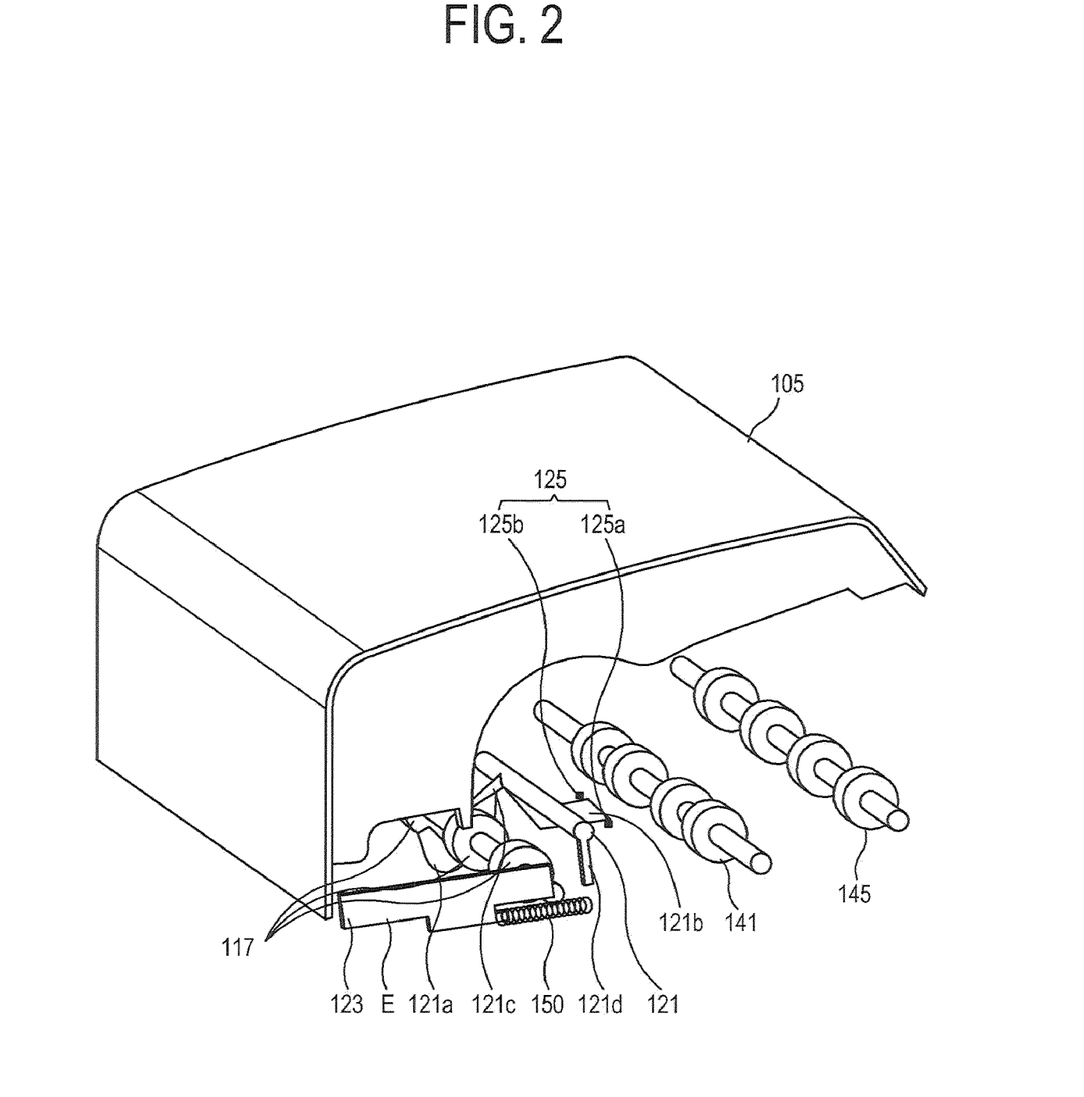
FIG. 2 is a schematic side view of relevant portions of the scanner in FIG. 1.

As shown in FIGS. 1 and 2, a scanner 1, according to an embodiment of the present disclosure, can include a scanning unit 220 configured to scan a document, a lower apparatus 200 that can include a lower main body 210 configured to accommodate or hold the scanning unit 220, and an automatic document feeder 100 configured to transport or move a document to the scanning unit 220.

The automatic document feeder 100 can include a transport unit 110 configured to transport a document from a loading support 102 to the scanning unit 220, an apparatus main body 101 configured to accommodate or hold the transport unit 110, a cover 105 disposed on the apparatus main body 101, and is configured to rotate about a hinge pivot 103. A sensing unit 120 may be disposed between the transport unit 110 and the scanning unit 220 along a document transport path S. The sensing unit 120 may be configured to sense whether the cover 105 is open or closed and the position of the document.

The automatic document feeder 100 may be detachably mounted on the lower main body 210.

The scanning unit 220 can include a light source (not shown) configured to emit a light in a direction of a document, and one or more of a charge coupled device (CCD), a contact image sensor (CIS), or other like device, each of which can be configured to sense light being reflected from the document to convert the information associated with the reflected light to an image data.

The transport unit 110 can include a pickup roller 111 configured to pick up a document D from the loading support 102, and multiple transport rollers 113, 115 and 117 configured to transport or move the document D to the scanning unit 220. The position and number of the transport rollers 113, 115 and 117 can be varied to be appropriate with one or more design conditions.

The sensing unit 120 can include a lever 121, a member 123, and a sensor 125.

Figure 3A:
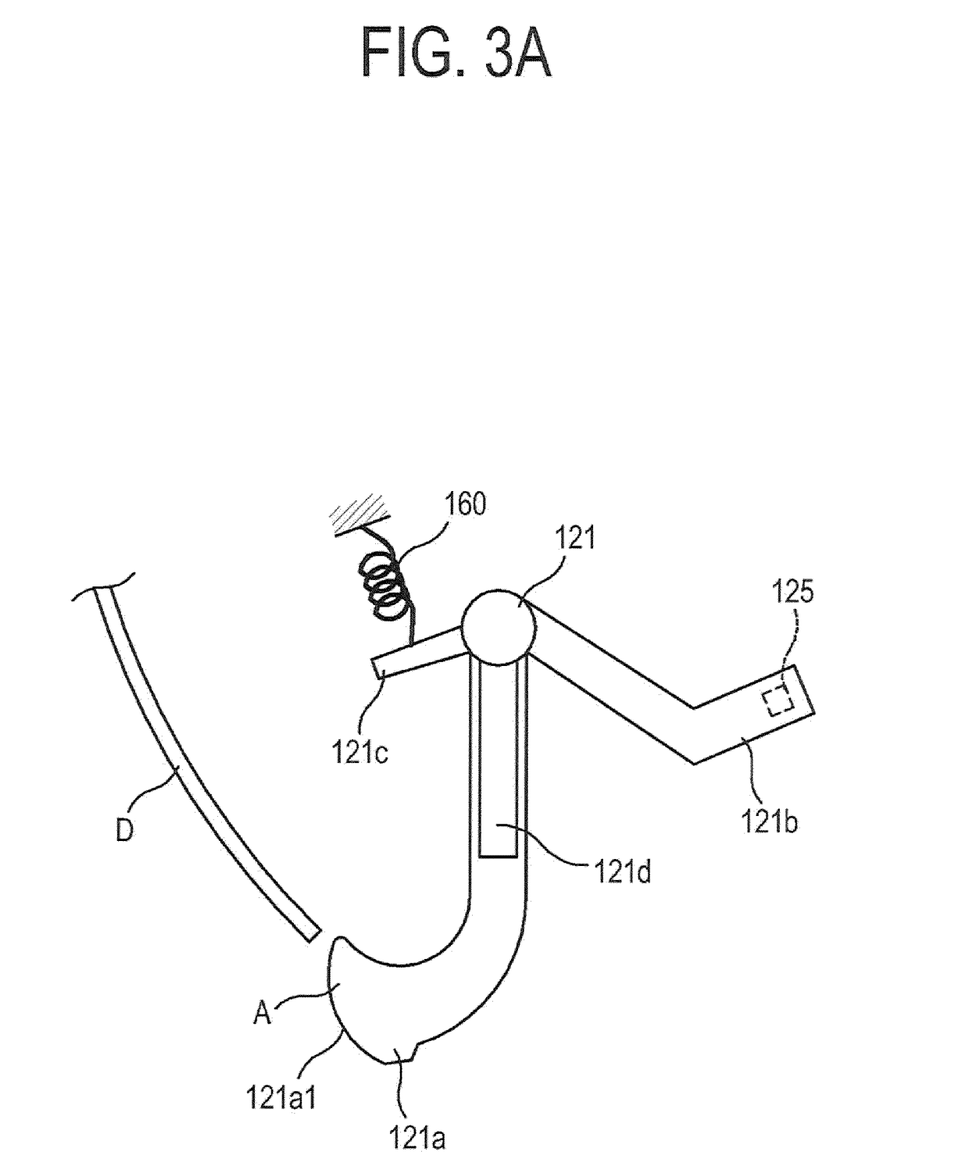
FIGS. 3A and 3B schematically illustrate operating states before and after a lever of the scanner in FIG. 1 contacts a document.
Figure 3B:
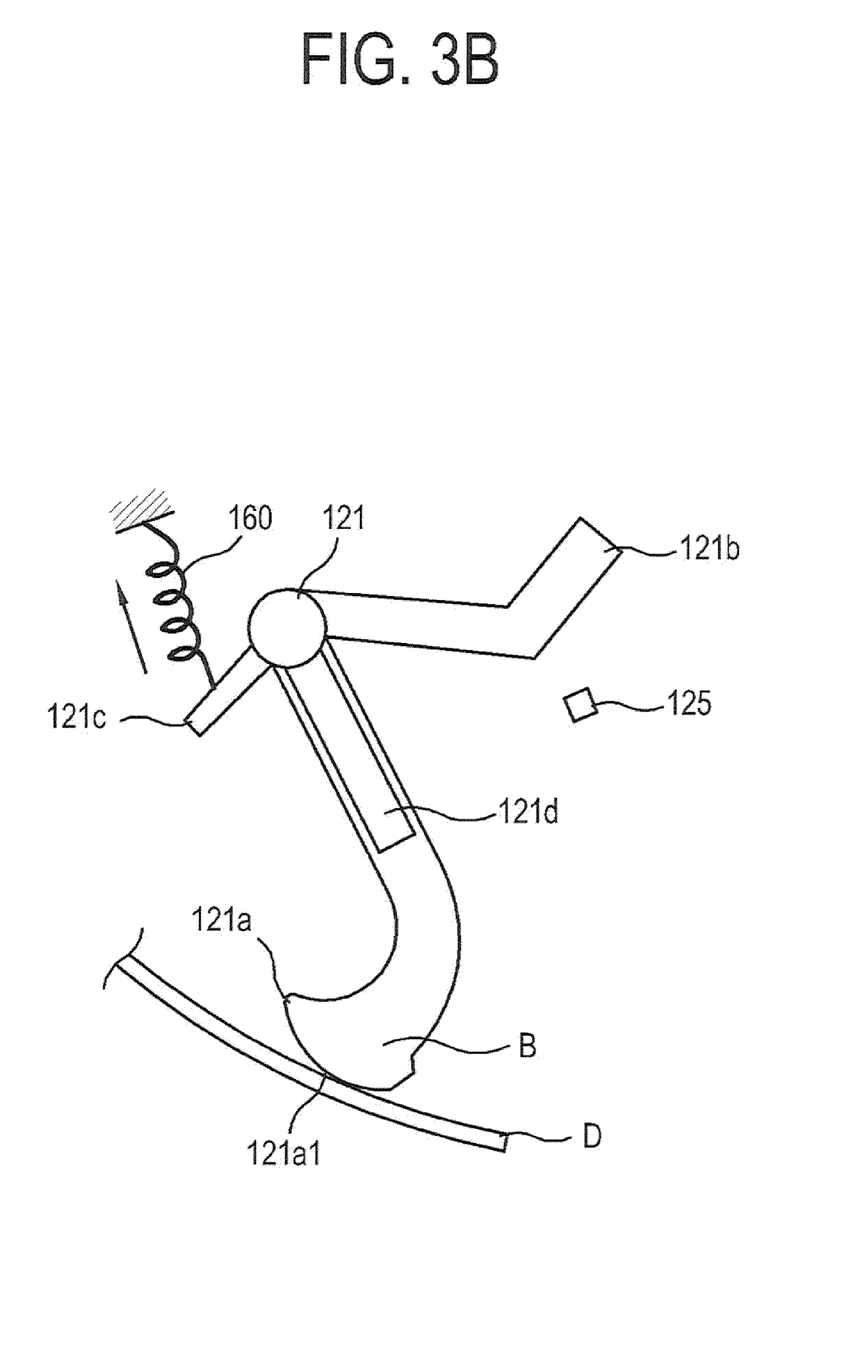

As shown in FIGS. 3A and 3B, the lever 121 can be configured to rotate between different positions based on whether the lever 121 is in contact with document D or not. For example, the lever 121 can be in a position A (see FIG. 3A) or in a position B (see FIG. 3B), where position A can be upstream with respect to position B along a direction in which the document D is transported within the scanner I (e.g., direction of document transport path S). The lever 121 can be supported by the apparatus main body 101.

In one embodiment, the lever 121 can be in position A before the lever 121 makes contact with the document D and can rotate from position A to position B when the lever 121 makes contact with the document D. Position B can be downstream with respect to position A along the transport direction of the document D.

While in this embodiment the lever 121 is illustrated as being rotated from one position to another, in other embodiments the lever 121 can be configured to slideably move between positions. Thus, when the lever 121 is configured to move between different positions based on whether the lever 121 is in contact or not with the document D, the movement between positions need not be limited to a rotation of the lever 121.

As shown in FIGS. 1 and 2, the lever 121 can include a contact unit 121a configured to contact the document D as it passes through the document transport path S, and an extension unit 121b configured to extend toward the sensor 125. In this embodiment, the lever 121 can be integrally formed, while in other embodiments, the various components of the lever 121 can be separate components.

As shown in FIG. 3A, the contact unit 121a can include a curved surface portion 121a1 having a surface with a curved shape so that the document D can easily pass through the contact unit 121a when the contact unit 121a makes contact with a front end of the document D. The shape of the curved surface portion 121a1 of the contact unit 121a is such that the document D is not affected (e.g., damaged) when the curved surface portion 121a1 makes contact with the document D.

As shown in FIG. 2, the sensor 125 can include an emitter unit 125a configured to emit light, for example, and a receiver unit 125b configured to receive the output emitted by the emitter unit 125a. As shown in FIG. 3A, when the lever 121 does not contact the document D the lever 121 can be in position A, and, in that position, the extension unit 121b blocks the light from the emitter unit 125a to prevent the light from reaching the receiver unit 125b. Thus, when the receiver unit 125b does not receive light from the emitter unit 125a, a light receiving signal produced by the receiver unit 125b is turned or switched to an 'off' level or state.

As shown in FIG. 3B, when the lever 121 contacts the document D, the lever 121 can move to position B such that the light produced by the emitter unit 125a can reach the receiver unit 125b. As a result, the light receiving signal produced by the receiver unit 125b is turned or switch to an 'on' level or state.

In the embodiment described above, the sensor 125 is disposed so that the light receiving signal produced by the receiver unit 125b is turned to an 'off' level and an 'on' level when the lever 121 is in position A and when the lever 121 is in position B, respectively. In other embodiments, the sensor 125 can be configured such that the light from the emitter unit 125a reaches the receiver unit 125b when the lever 121 is in position A (e.g., upstream along the document transport path S) and the light from the emitter unit 125a is blocked from reaching the receiver unit 125b when the lever 121 is in position B (e.g., downstream along the document transport path S).

Figure 4:
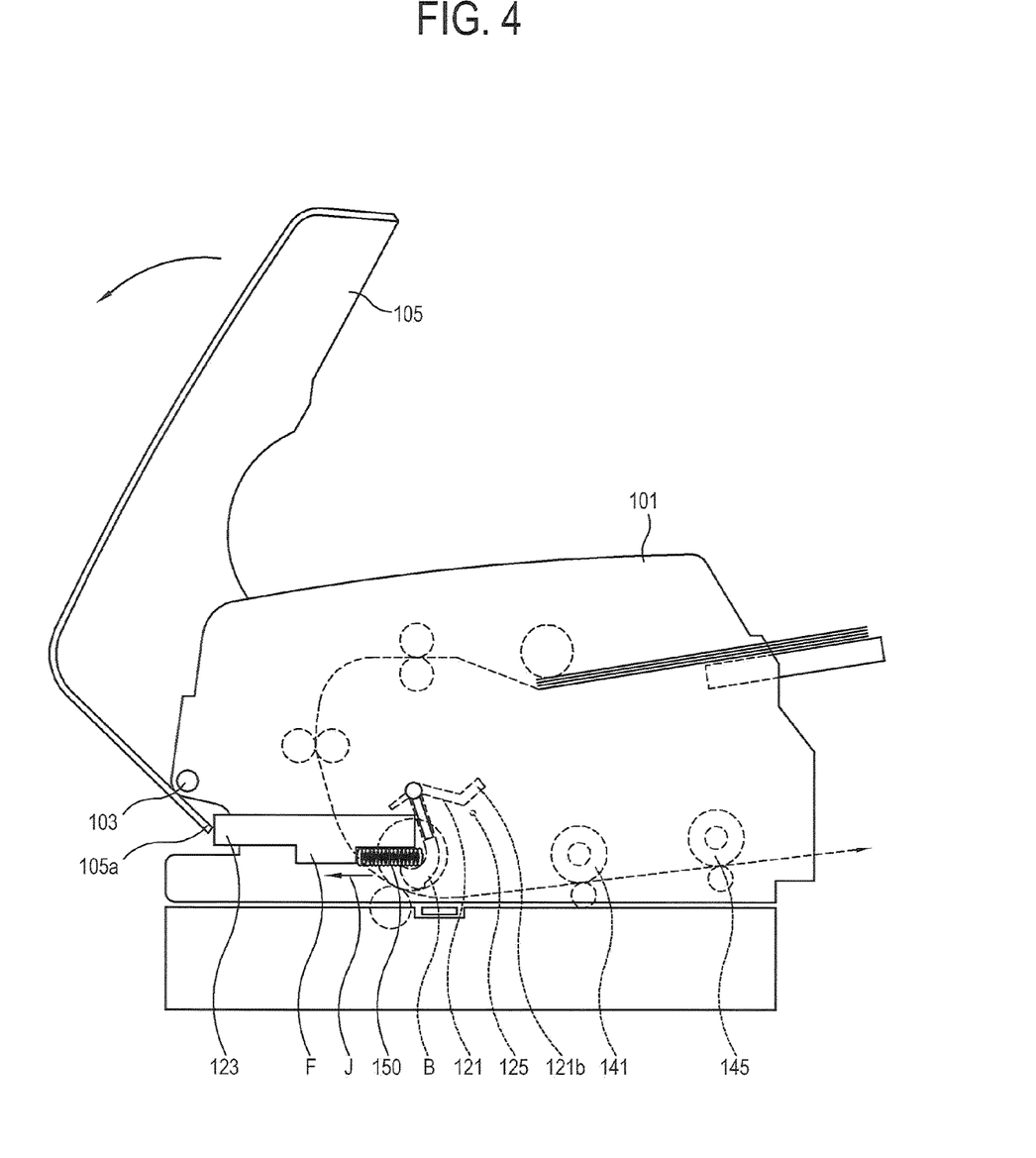
FIG. 4 illustrates the lever moving to interlock with opening of a cover of the scanner in FIG. 1.

As shown in FIGS. 2 and 4, the member 123 of the sensing unit 120 can be configured to interlock with the opening and the closing rotation of the cover 105 to move the lever 121 to position B and to position A, respectively.

FIG. 2 is a schematic side perspective view of the scanner 1 that omits at least a portion of the apparatus main body 101 when the cover 105 is rotated to close the top portion of the apparatus main body 101.

As shown in FIG. 4, the member 123 can move to a contact position F in which the member 123 is in contact with the lever 121 and with the cover 105 when the cover 105 is rotated to an open position. The member 123 can move to a contact-withdrawing position E (see FIG. 2) in which the member 123 is not in contact with the lever 121 or with the cover 105 when the cover 105 is rotated to a close position.

The member 123 can be configured to slideably move between the contact position F and the contact-withdrawing position E. A guide unit (not shown) can be included in the apparatus main body 101 to allow the member 123 to slideably move.

In this embodiment, the member 123 is illustrated to slide rectilinearly. In other embodiments, however, the member 123 can be configured to rotate when moving between positions.

As shown in FIG. 4, when the cover 105 rotates to an open position, an end unit 105a of the cover 105 can be configured to push a first end portion of the member 123 such that the member 123 moves from the contact-withdrawing position E to the contact position F. By moving the member 123 to the contact position F, a second end portion of the member 123 can make contact with the lever 121 to move the lever 121 to position B.

Figure 5:
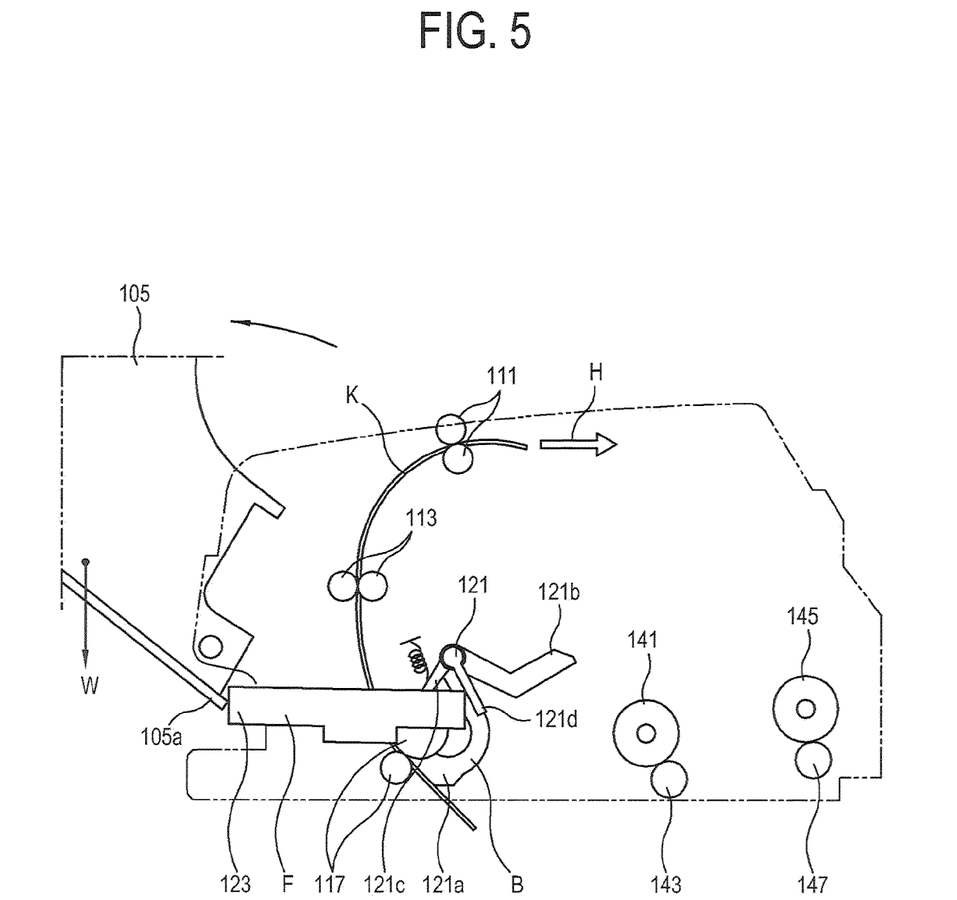
FIG. 5 is a schematic side view of the scanner in FIG. 1 when a document is jammed in a lever position.

FIG. 5 is a schematic side view of the scanner I with the cover 105 rotated to the open position to eject a document K when the document K is jammed inside the scanner 1, and is in contact with the lever 121.

In such an instance, the lever 121 can be prevented from moving from position B to position A by the member 123. The end unit 105a of the cover 105 continuously pushes on the member 123 because of the force exerted by the weight W of the cover 105 while in the open position. As a result, the lever 121, which is in contact with the member 123, can be prevented from rotating toward the upstream position, that is, position A. Thus, even when a user pulls the jammed document K in a direction H that is opposite to the document transportation direction S, the lever 121 can be prevented from moving in the direction H such that the jammed document K is not damaged by the lever 121 when being ejected from the scanner 1 by the user.

The automatic document feeder 100 can include a first elastic member 150 (e.g., a spring) configured to elastically bias the member 123 toward the contact-withdrawing position E when the cover 105 is closed (see FIG. 2). In this embodiment, a first end portion of the first elastic member 150 can be coupled to the member 123 and a second end portion of the first elastic member 150 can be coupled to the apparatus main body 101. As shown in FIG. 4, an elastic force J produced by the first elastic member 150 can move the member 123 from the contact position F to the contact-withdrawing position E.

In another embodiment, a link (not shown) can be disposed between the cover 105 and the member 123 and can be configured to move the member 123 to the contact position F illustrated in FIG. 4 or to the contact-withdrawing position E illustrated in FIG. 2 to interlock with the opening or closing of the cover 105, respectively.

As shown in FIGS. 3A and 3B, the automatic document feeder 100 can include a second elastic member 160 (e.g., a spring) configured to elastically bias the lever 121 to position A. A first end portion of the second elastic member 160 can be coupled to a protrusion 121c of the lever 121 and a second end portion of the second elastic member 160 can be coupled to the apparatus main body 101. Thus, the lever 121 can be in position B when the contact unit 121a of the lever 121 is in contact with the document D and can be restored or returned back to position A when the contact unit 121a is not in contact with the document D.

In other embodiments, the lever 121 can be moved to position A by, for example, gravity, an elastic restoring force of material from which the lever 121 is made, or other configurations, without the need for an elastic member such as the second elastic member 160.

The lever 121 can include a driven unit 121d configured to extend from an outer surface of the lever 121 in a radial or lateral direction to contact the member 123. In some embodiments, to produce a larger rotation moment of the lever 121 from the rectilinear movement of the member 123, the driven unit 121d can be configured to extend in a direction that is substantially perpendicular to the direction in which the member 123 moves.

Figure 6:
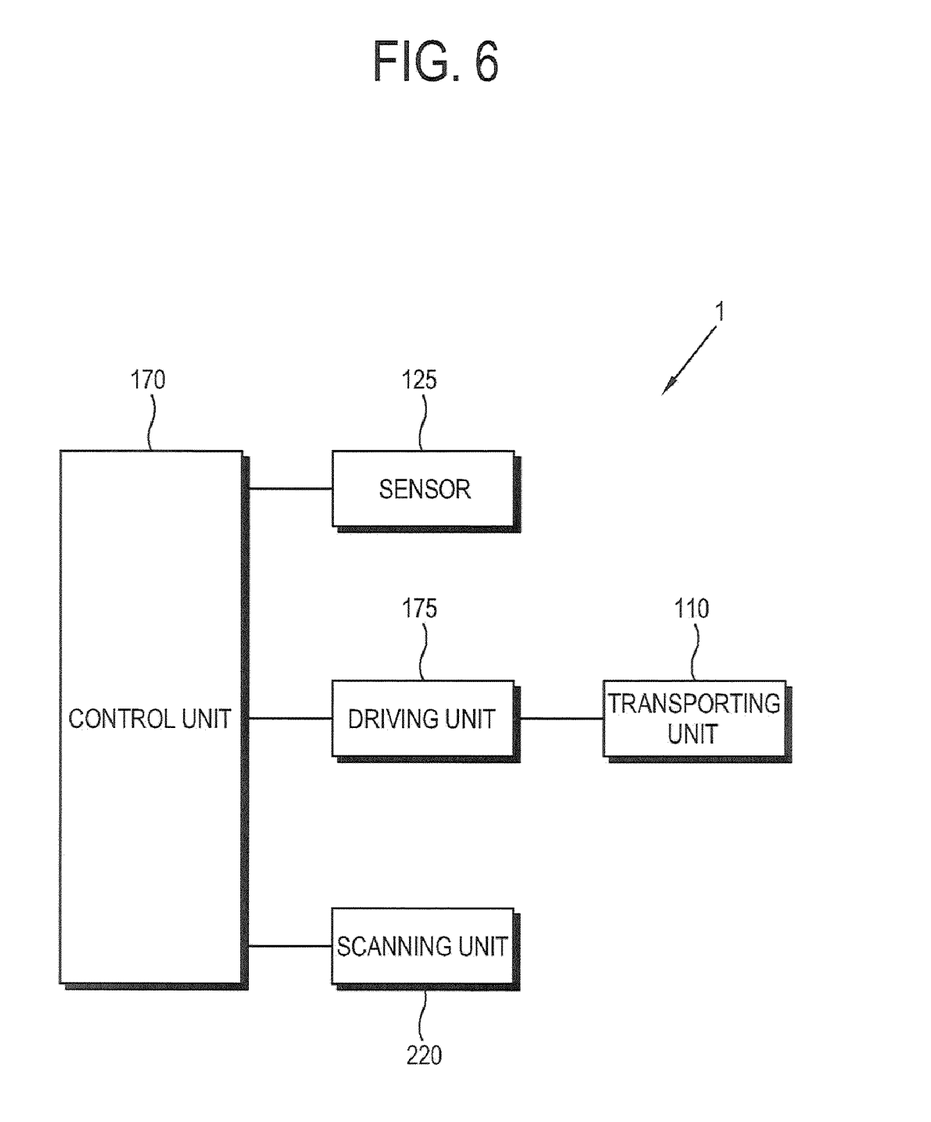
FIG. 6 is a schematic block diagram of the scanner in FIG. 1.

As shown in FIG. 6, the scanner 1 can include a driving unit 175 configured to drive the transport unit 110, and a control unit 170 configured to control the scanning unit 220 and the driving unit 160. In some embodiments, the control unit 170 can be configured to only control the automatic document feeder 100. In such embodiments, the scanning unit 220 can be separately controlled by a different component or portion of the scanner 1.

The driving unit 175 can include at least one electric driving motor.

When a document scanning command or signal is received by the control unit 170, the control unit 170 can control the driving unit 175 and can cause the driving unit 175 to transport a document to the scanning unit 220. The control unit 170 can also control the scanning unit 220 and can cause the scanning unit 220 to scan the transported document.

The document scanned by the scanning unit 220 can be discharged out of the apparatus by discharge rollers 141, 143, 145, and 147. In some embodiments, the driving unit 175 can drive or operate drive rollers 141 and 145 from among the discharge rollers 141, 143, 145, and 147.

The control unit 170 can be configured to determine the position of a document and/or the opening and closing of the cover 105 based on a sensing result produced by the sensor 125 and/or an operating state of the transport unit 110.

For example, the control unit 170 can determine that the cover 105 is in the open position when the lever 121 is sensed to be in position B and the transport unit 110 is in a stop state. The lever 121 can be sensed to be in position B when a light receiving signal produced by the sensor 125 is 'on'. The transport unit 110 can be in the stop state when no electric power is supplied to the driving unit 175 that drives the transport unit 110.

Figure 7:
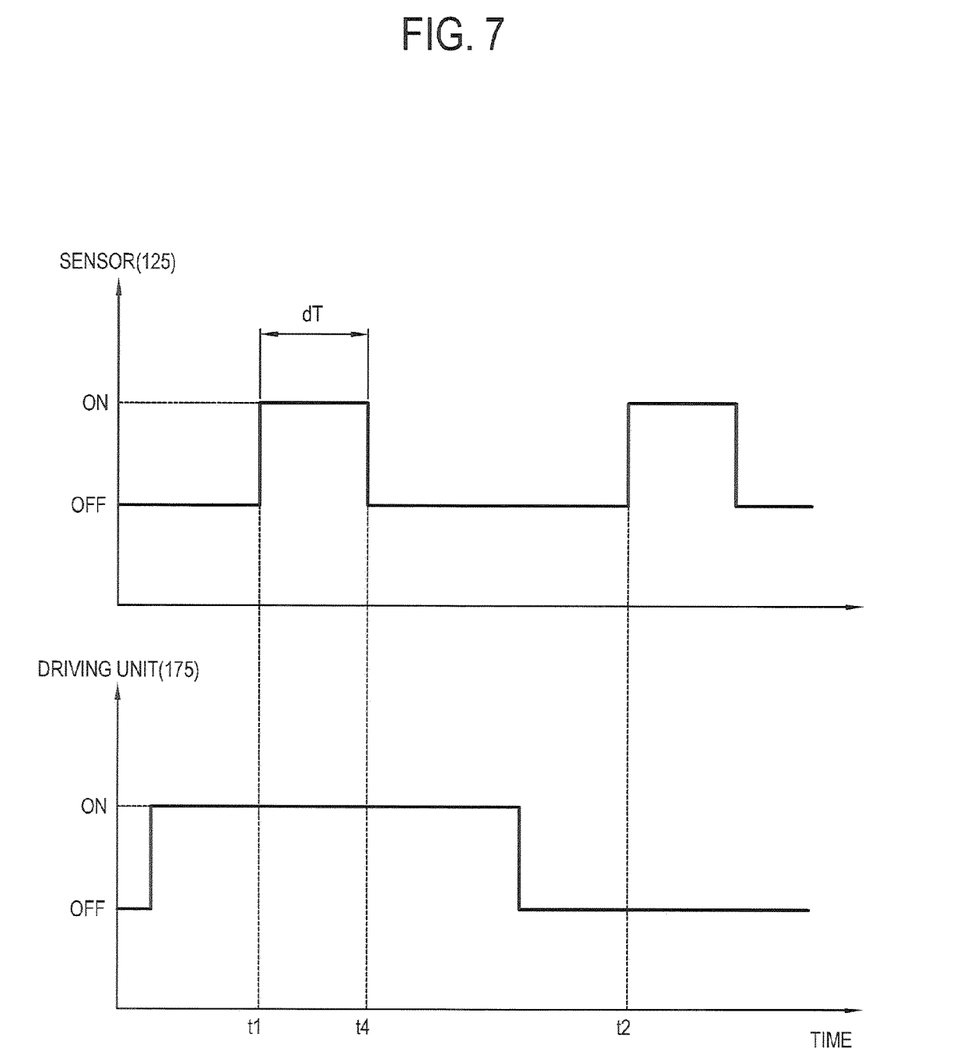
FIG. 7 illustrates an example of a sensing signal of a sensor and an operating state of a drive unit of the scanner in FIG. 6.

FIG. 7 shows that the light receiving signal of the sensor 125 can be turned to an 'on' level when the cover 105 is opened or when the document D is passing through the location where the lever 121 is disposed. To determine which of these events causes the change in the light receiving signal, the operating state of the transport unit 110 can be used. For example, when the electric power supplied to the driving unit 175 (that is, the driving unit is 'on') at a first time instance (t1) during which the light receiving signal of the sensor 125 is switched from an 'off' level to an 'on' level, it can be determined that the document D is passing through the lever 121.

In another example, when no electric power is provided to the driving unit 175 (that is, the driving unit is 'off') at a second time instance (t2) during which the light receiving signal of the sensor 125 is switched from an 'off' level to an 'on' level, it can be determined that the cover 105 is open because the transport unit 110 is not being driven.

In this embodiment, the time instance at which the light receiving signal of the sensor 125 switched from an 'off' level to an 'on' level can indicate that the lever 121 is moved from position A to position B, and whether there is electric power being provided to the driving unit 175, that is, whether power to the driving unit 175 is turned 'on' or 'off', can be used to indicate whether the transport unit 10 is in the driving state (e.g., power is on) or in the stop state (e.g., power is off).

Figure 8:
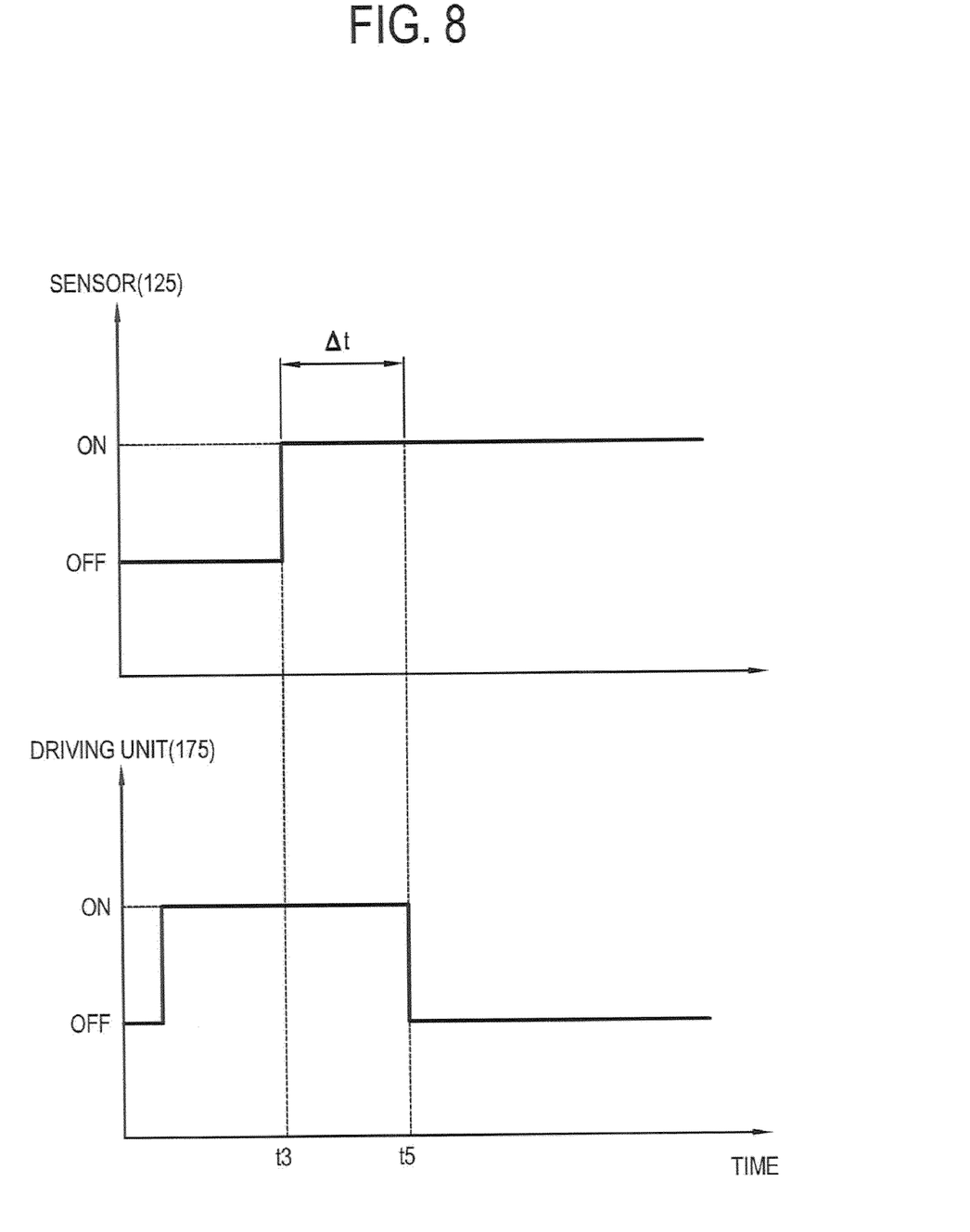
FIG. 8 illustrates another example of the sensing signal of the sensor and the operating state of the drive unit of the scanner in FIG. 6.

FIG. 8 illustrates an instance in which, because electric power is being supplied to the driving unit 175 at a third time instance (t3) when the light receiving signal of the sensor 125 is switched from an 'off' level to an 'on' level, the control unit 170 can determine that at time t3 the document D is in contact with the lever 121 and is passing through the lever 121.

When the light receiving signal of the sensor 125 is not switched back to the 'off' level within a predetermined time internal (Δt) from the time t3, that is, when the lever 121 is not restored to position A from position B, the control unit 170 can determine that the document is jammed and is in contact with the lever 121.

In such an instance, the control unit 170 can generate signals that can be used to inform a user of the jammed document. An indication of the occurrence of a jammed document can be displayed on a display unit (not shown) when the scanner 1 includes such a display unit. The indication of the occurrence of a jammed document can be in the form of an alarm or a voice when the scanner I includes a speaker (not shown). In some embodiments, the display unit can include a liquid crystal display (LCD) or other like display.

Moreover, when the control unit 170 determines that the document D is jammed inside the scanner 1, the control unit can control the driving unit 175 to stop the transport unit 110. FIG. 8 also illustrates that when the light receiving signal of the sensor 125 is at an 'on' level during a fifth time instance (t5), where time t5 corresponds to a time instance elapsing from time t3 by a predetermined time Δt (t5=t3+Δt), the control unit 170 can stop the transport unit 110 at such time t5.

FIG. 7 shows that when a time interval dT, between time t1 and a fourth time instance (t4) at which the light receiving signal of the sensor 125 is switched to an 'off' level again, is equal to or less than the predetermined time Δt, the control unit 170 can determine that the back end of the document D has completely passed through the lever 121.

Although a few exemplary embodiments of the present disclosure have been shown and described, it will be appreciated by those skilled in the art that changes may be made in these exemplary embodiments without departing from the principles and spirit of the disclosure, the scope of which is defined in the appended claims and their equivalents.

What is claimed is:

1. An automatic document feeder, comprising:
   a transport unit configured to transport a document to a scanning unit along a document transportation path;
   a cover rotatably disposed on an apparatus main body configured to house therein the transport unit; and
   a sensing unit disposed along the document transportation path, the sensing unit being configured to sense the position of the document as well as whether the cover is open or closed,
   wherein the sensing unit comprises
   a lever configured to move between a first position and a second position along the document transportation path, the lever being in contact with the document passing through the document transportation path when in the first position, the lever not being in contact with the document passing through document transportation path when in the second position; and
   a member movable in association with the cover, the member being configured to move the lever to select one of the first position and the second position based on whether the cover is open or closed; and
   a sensor configured to sense the position of the lever,
   wherein the member of the sensing unit is configured to prevent the lever from moving from the first position to the second position when the cover is open.

2. The automatic document feeder according to claim 1, wherein the lever is rotatably disposed within the apparatus main body.

3. The automatic document feeder according to claim 1, wherein the member is configured to move to a contact position in which the member is in contact with the lever when the cover is open, the member being further configured to move to a contact-withdrawing position in which the member is not in contact with the lever when the cover is closed.

4. The automatic document feeder according to claim 3, further comprising a driven unit configured to extend out from an outer surface of the lever in a radial direction, the driven unit being configured to come into an interfering contact with the member.

5. The automatic document feeder according to claim 3, wherein the member is configured to slideably move between the contact position and the contact-withdrawing position.

6. The automatic document feeder according to claim 3, further comprising a first elastic member configured to elastically bias the member of the sensing unit toward the contact-withdrawing position.

7. The automatic document feeder according to claim 1, further comprising a second elastic member configured to elastically bias the lever toward the second position.

8. The automatic document feeder according to claim 1, further comprising a control unit configured to determine the position of the document and whether the cover is open or closed based on a sensing result of the sensor and an operational state of the transport unit.

9. The automatic document feeder according to claim 8, wherein the control unit is configured to determine that the cover is in an open position when the lever is sensed to move from the second position to the first position and the transport unit is in a stop state.

10. The automatic document feeder according to claim 8, wherein the control unit is configured to determine that the document is passing through the lever when the lever is sensed to move from the second position to the first position and the transport unit is in an operating state.

11. The automatic document feeder according to claim 10, wherein the control unit is configured to determine that the document has passed through the lever when the lever moves from the first position to the second position within a predetermined time.

12. The automatic document feeder according to claim 10, wherein the control unit is configured to determine that the document is jammed when the lever does not move from the first position to the second position within a predetermined time.

13. The automatic document feeder according to claim 12, wherein the control unit is configured to stop the transport unit when the document is determined to be jammed.

14. An automatic document feeder, comprising:
a transport unit configured to transport a document to a scanning unit along a document transportation path;
a cover rotatably disposed on an apparatus main body configured to support therein the transport unit;
a lever configured to move between a first position and a second position along the document transportation path, the lever being in contact with the document passing through the document transportation path when in the first position, the lever not being in contact with the document passing through document transportation path when in the second position; and
a member configured to prevent the lever from moving from the first position to the second position when the cover is open.

15. An automatic document feeder useable with a document scanner, the document scanner including a main housing body for supporting therein a transport unit configured to deliver a document to be scanned to a scanning unit along a document transport path, the main housing body having disposed thereon a cover, the automatic document feeder comprising:
a lever disposed at a sensing location along the document transport path, the lever being movable between a first position and a second position, the lever being in contact with the document passing through the document transportation path when in the first position, the lever not being in contact with the document passing through document transportation path when in the second position;
a member movable in association with the cover between a contact position and a non-contact position, the member being in the contact position when the cover is open, the member being in an interfering contact with the lever so as to cause the lever to move to the first position when the member is in the contact position, the member being in the non-contact position when the cover is closed, the member not contacting the lever when the member is in the non-contact position, the member being configured to remain in the contact position to prevent the lever from moving from the first position to the second position while the cover is open; and
a sensor configured to output a sensing signal indicative of a position of the lever.

16. The automatic document feeder according to claim 15, further comprising:
a control unit configured to determine that the document to be scanned is positioned at the sensing location along the document transport path if the sensing signal from the sensor indicates that the lever is in the first position when the transport unit is operating,
wherein the control unit being further configured to determine that the cover is open if the sensing signal from the sensor indicates that the lever is in the second position when the transport unit is not operating.

17. The automatic document feeder according to claim 16, wherein the control unit is further configured to determine a document jam has occurred if based on the sensing signal the lever has not moved from the first position to the second position within a predetermined time while the transport unit is operating.

* * * * *

UNITED STATES PATENT AND TRADEMARK OFFICE
CERTIFICATE OF CORRECTION

PATENT NO. : 8,326,204 B2
APPLICATION NO. : 12/502578
DATED : December 4, 2012
INVENTOR(S) : Jung-Yun Won It is certified that error appears in the above-identified patent and that said Letters Patent is hereby corrected as shown below:

Title Page Col. 2 (Other Publications); Line 1, Delete "langauge" and insert -- language --, therefor.
Title Page Col. 2 (Other Publications); Line 3, Delete "langauge" and insert -- language --, therefor.

Signed and Sealed this
Seventh Day of May, 2013

Teresa Stanek Rea
*Acting Director of the United States Patent and Trademark Office*